(12) United States Patent
Simmons (10) Patent No.: US 12,117,941 B2
(45) Date of Patent: *Oct. 15, 2024

(54) SECURITY OF EMBEDDED DEVICES THROUGH A DEVICE LIFECYCLE WITH A DEVICE IDENTIFIER

(71) Applicant: Microchip Technology Incorporated, Chandler, AZ (US)

(72) Inventor: Michael Simmons, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,446

(22) Filed: Apr. 19, 2023

(65) Prior Publication Data

US 2023/0251977 A1 Aug. 10, 2023

Related U.S. Application Data

(63) Continuation of application No. 16/806,227, filed on Mar. 2, 2020, now Pat. No. 11,663,146.

(60) Provisional application No. 62/867,552, filed on Jun. 27, 2019.

(51) Int. Cl.
 *G06F 12/14* (2006.01)
 *G06F 3/06* (2006.01)

(52) U.S. Cl.
 CPC ........ *G06F 12/1416* (2013.01); *G06F 3/0616* (2013.01); *G06F 3/0653* (2013.01); *G06F 3/0659* (2013.01); *G06F 3/0679* (2013.01)

(58) Field of Classification Search
 None
 See application file for complete search history.

(56) References Cited

U.S. PATENT DOCUMENTS

| | | | |
|---|---|---|---|
| 11,533,187 B2 * | 12/2022 | Gulati | G06F 21/57 |
| 2006/0131743 A1 | 6/2006 | Erickson et al. | 257/737 |
| 2013/0339734 A1 * | 12/2013 | Vernia | H04L 63/101 |
| | | | 713/168 |
| 2018/0097639 A1 | 4/2018 | Gulati et al. | |
| 2019/0007212 A1 * | 1/2019 | Neve De Mevergnies | H04L 9/3226 |

(Continued)

OTHER PUBLICATIONS

Schellekens, Dries, Pim Tuyls, and Bart Preneel. "Embedded trusted computing with authenticated non-volatile memory." International Conference on Trusted Computing. Berlin, Heidelberg: Springer Berlin Heidelberg, 2008. (Year: 2008).*

(Continued)

*Primary Examiner* — Nicholas J Simonetti
(74) *Attorney, Agent, or Firm* — SLAYDEN GRUBERT BEARD PLLC (57) ABSTRACT

An apparatus includes a database with device profiles, and a device programmer. The device programmer includes instructions. The instructions, when read and executed by a processor, cause the device programmer to identify a device identifier of an electronic device. The device programmer is further caused to, based upon the device identifier, access device data from the database. The device programmer is further caused to, based upon the device data, determine an area of memory of the electronic device that can be written. The device programmer is further caused to, based on the determination of the area of memory of the electronic device that can be written, write data to the area of memory.

30 Claims, 4 Drawing Sheets

(56) References Cited

U.S. PATENT DOCUMENTS

2020/0085105 A1    3/2020   Barbaric et al.
2021/0150165 A1    5/2021   Sturgill et al.
2024/0089242 A1*   3/2024   Gulati .................. H04L 9/3268

OTHER PUBLICATIONS

Lesjak, C. et al., "A Secure Hardware Module and System Concept for Local and Remote Industrial Embedded System Identification," Proceedings of 2014 IEEE Emerging Technology and Factory Automation (ETFA), 7 pages.
International Search Report and Written Opinion, Application No. PCT/US2020/024854, 11 pages.

* cited by examiner

SECURITY OF EMBEDDED DEVICES THROUGH A DEVICE LIFECYCLE WITH A DEVICE IDENTIFIER

CROSS-REFERENCE TO RELATED APPLICATIONS

This application is a continuation of U.S. application Ser. No. 16/806,227 filed on Mar. 2, 2020, which claims the benefit of U.S. Application No. 62/867,552 filed on Jun. 27, 2019, which are incorporated herein in their entirety.

TECHNICAL FIELD

The present disclosure relates to electronic security and, more particularly, to tracking an embedded device security lifecycle through a device identifier (ID).

BACKGROUND

On-chip instrumentation for a variety of semiconductor devices may conform to any number of industry standards, such as JTAG or IEEE 1149. Manufacture of semiconductor devices may be validated through tests using such protocols. During manufacture of semiconductor devices, data may be written using a device programmer to such semiconductor devices. Data may be written to non-volatile memory in such devices. In addition, firmware and software may be loaded onto such devices.

A semiconductor device may be operable in different modes, such as a debug mode or a released, end user mode. The debug mode may make access to certain elements of the semiconductor device available so that engineering, test, or validation staff associated with the production of the semiconductor device may evaluate the quality or operation of the semiconductor device. The released, end user mode may allow the semiconductor device to operate in a manner intended for end users of the semiconductor device.

In typical applications, the status or state of the semiconductor device is determined based on where the semiconductor device is physically present in the lifecycle-whether at production in a factory, in validation or test at a factory, or in the hands of an end user. Moreover, in typical applications, determining the status or state of the semiconductor device is performed by observing the behavior of the semiconductor device. For example, if a semiconductor device presents its debug mode options, the semiconductor device may be determined to be in debug mode.

Inventors of embodiments of the present disclosure have discovered that in a semiconductor device containing security keys and security features, such as wherein these security keys and security features are configured to provide secure booting or secure debugging, independently determining the state of the security of the semiconductor device is important so that the semiconductor device can be verified and appropriately used and distributed. For example, it may be desirable to allow a developer or test engineer, while debugging the secure bootloader on a semiconductor device, to view and modify the bootloader code. It may be further desirable to prevent the same behavior on the same semiconductor device for end users. Embodiments of the present disclosure may utilize mechanisms on the device to provide such differentiated security.

SUMMARY

Embodiments of the present disclosure may include an apparatus. The apparatus may include a database including a plurality of device profiles. The apparatus may include a device programmer including instructions. The instructions, when read and executed by a processor, may cause the device programmer to identify a device identifier of an electronic device, then based upon the device identifier, access device data from the database, then based upon the device data, determine an area of memory of the electronic device that can be written, and then based on the determination of the area of memory of the electronic device that can be written, write data to the area of memory of the electronic device.

Embodiments of the present disclosure may include another apparatus. The other apparatus may include a memory and a device identifier configured to denote a phase of production for the apparatus, and to allow access to a first area of the memory that can be written.

Embodiments of the present disclosure may include an article of manufacture. The article of manufacture may include a non-transitory machine-readable medium. The medium may include instructions. The instructions, when read and executed by a processor, may cause the processor to identify a device identifier of an electronic device, then based upon the device identifier, access device data from the database, then based upon the device data, determine an area of memory of the electronic device that can be written, and then based on the determination of the area of memory of the electronic device that can be written, write data to the area of memory of the electronic device.

Embodiments of the present disclosure may include another article of manufacture. The article of manufacture may include a non-transitory machine-readable medium. The medium may include instructions. The instructions, when read and executed by a processor, may cause the processor to provide access to an electronic device for a device programmer, provide a device identifier to the device programmer from a memory, and based on the device identifier, denote a phase of production for the apparatus and allow access to an area of the memory that can be written.

Embodiments of the present disclosure may include a method. The method may include accessing an electronic device, identifying a device identifier of the electronic device, then based on the device identifier, accessing device data from a database including device profiles, then based upon the device data, determining an area of memory of the electronic device that can be written, and then based on the determination of the area of memory of the electronic device that can be written, writing data to the area of memory of the electronic device.

Embodiments of the present disclosure may include another method. The method may include providing access to an electronic device for a device programmer, providing a device identifier to the device programmer from a memory, and, based on the device identifier, denoting a phase of production for the electronic device and allowing access to a first area of the memory that can be written.

DETAILED DESCRIPTION

Embodiments of the present disclosure may include an apparatus. The apparatus may be included in a system. The system may be a production system for producing electronic devices, a test or validation system for validating electronic devices, an affiliate system for customizing electronic devices, or an end user system. The apparatus may include a database including device profiles. The database may be implemented in any suitable manner. The apparatus may include a device programmer. The device programmer may be configured to access electronic devices, read identifiers, write identifiers, and otherwise provision the electronic devices using interfaces such as JTAG. The device programmer may be implemented by any suitable combination of analog circuitry, digital circuitry, or instructions for execution by a processor. The instructions may be stored on a non-transitory machine-readable medium. The instructions, when read and executed by a processor, cause the device programmer to identify a first device identifier of a first electronic device. The identifier may be set in one-time programmable fuses. The device programmer may be caused to access first device data from the database based upon the first device identifier. Device data may include a memory map of a respective electronic device. The device programmer may be caused to determine a first area of memory of the first electronic device that can be written based upon the first device data. The device programmer may be caused to write data to the first area of memory of the first electronic device based on the determination of the first area of memory of the first electronic device that can be written.

In combination with any of the above embodiments, the first device data may include a first memory map of the first device, the first memory map configured to define the first area of memory of the first electronic device as programmable.

In combination with any of the above embodiments, the first memory map may be further configured to define a second area of memory of the first electronic device that is not programmable.

In combination with any of the above embodiments, the first memory map may be further configured to define the second area of memory of the first electronic device as unseen from usage of the first electronic device.

In combination with any of the above embodiments, the device programmer may be further configured to, upon writing data to the first area of memory of the first electronic device, replace the first device identifier with a second device identifier on the first electronic device. The second device identifier may overwrite the first device identifier by setting additional fuses in a memory location that defines the identifier for the first electronic device.

In combination with any of the above embodiments, the second device identifier may be configured to define a third area of memory that can be written.

In combination with any of the above embodiments, the second device identifier may be configured to prevent one or more other apparatuses from writing data to the first area of memory of the first electronic device.

In combination with any of the above embodiments, the second device identifier may be associated with a second memory map of the first electronic device, the second memory map configured to define the third area of memory of the first electronic device as programmable.

In combination with any of the above embodiments, the second device identifier may be configured to define that the first area of memory is unprogrammable.

In combination with any of the above embodiments, the device programmer may be further configured to identify a third device identifier of a second electronic device, and, based upon the third device identifier, determine that a different device programmer is configured to write data to the second electronic device instead of the device programmer.

In combination with any of the above embodiments, the first device identifier may be configured to allow access through a first memory map to debug features of the first electronic device; and the second device identifier may be configured to deny access through a second memory map to debug features of the first electronic device.

In combination with any of the above embodiments, the device identifiers may identify a stage of a lifecycle of the electronic devices. In another embodiment, when the device identifier is changed, it may be changed to a higher number but might not be reversible to be changed back to the original or a lower number. In yet another embodiment, the higher number may represent a subsequent stage of the lifecycle of the electronic devices.

Embodiments of the present disclosure may include another apparatus. The apparatus may implement any of the electronic devices of the above embodiments. The apparatus may include a memory and a first device identifier configured to denote a phase of production for the apparatus, and allow access to a first area of the memory that can be written. The device identifiers may be programmed through electronic fuses.

In combination with any of the above embodiments, the first device identifier may be configured to prevent programming of a second area of the memory.

In combination with any of the above embodiments, the second area of the memory might not be mapped for use of the apparatus.

In combination with any of the above embodiments, the first device identifier may be configured to be replaced by a second device identifier.

In combination with any of the above embodiments, the second device identifier may be configured to define a third area of memory that can be written.

In combination with any of the above embodiments, the second device identifier may be further configured to prevent writes of data to the first area of the memory.

In combination with any of the above embodiments, the second device identifier may be further configured to define that the first area of memory is unprogrammable.

In combination with any of the above embodiments, the first device identifier may be configured to allow access through a first memory map to debug features of the apparatus, and the second device identifier may be configured to deny access through a second memory map to debug features of the apparatus.

Embodiments of the present disclosure may include an article of manufacture including any of the non-transitory machine-readable media of any of the above embodiments.

Embodiments of the present disclosure may include methods performed by any of the apparatuses of any of the above embodiments.

Figure 1:
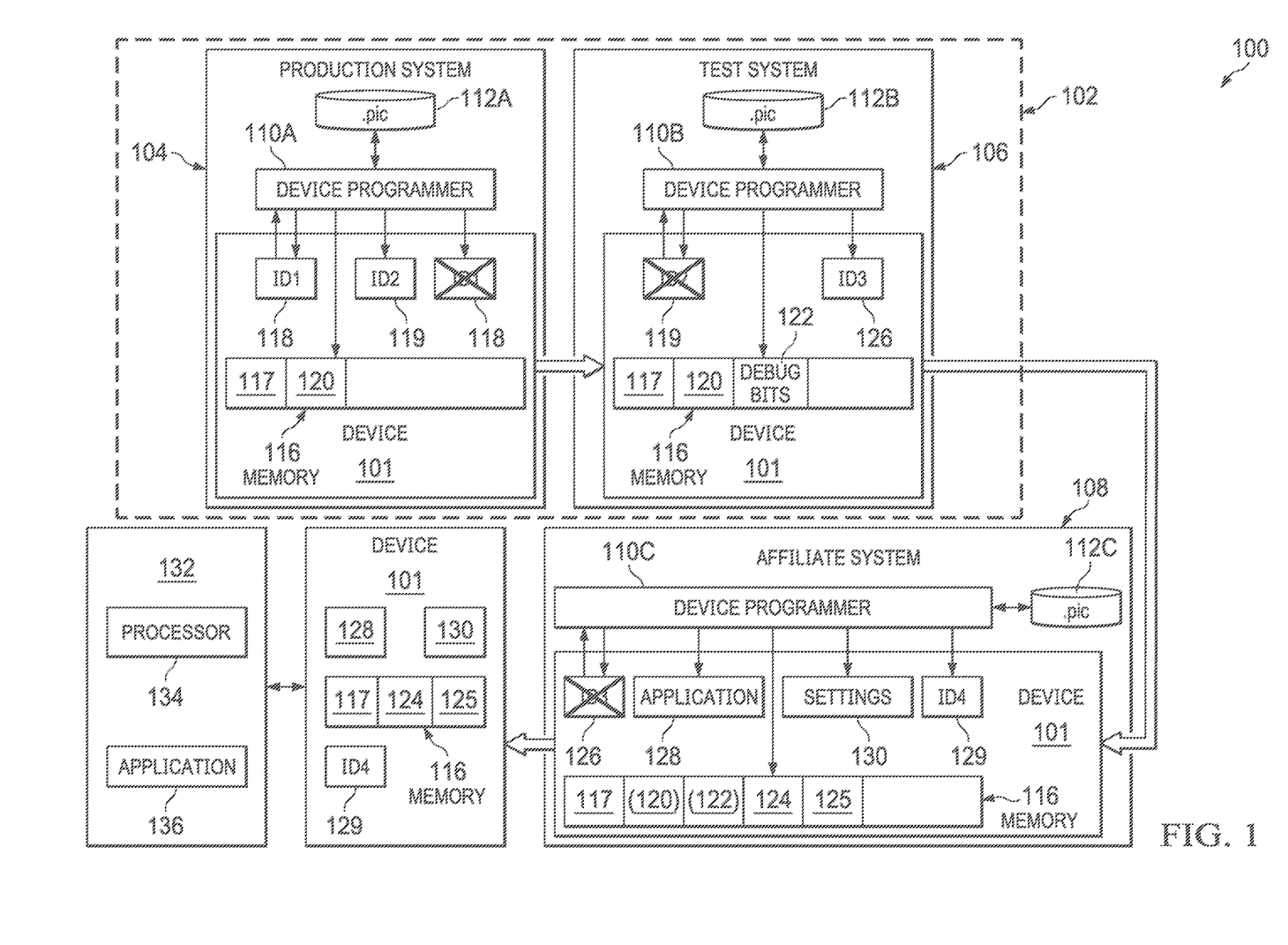
FIG. 1 is an illustration of an example system for tracking an embedded device security lifecycle through a device ID, according to embodiments of the present disclosure.

FIG. 1 is an illustration of an example system 100 for tracking an embedded device security lifecycle through a device ID, according to embodiments of the present disclosure.

System 100 may be configured to track the security lifecycle of any suitable device, such as device 101. System 100 may use JTAG or other suitable protocols to program, test, and access contents on device 101. Device 101 may be implemented in any suitable manner, such as a semiconductor device with firmware, a microcontroller, a chip, or any other suitable electronic device. Device 101 may include a memory 116. Various portions of system 100 may be configured to edit contents of memory 116 for device 101, or to provide device 101 one or more IDs. In one embodiment, device 101 may include multiple IDs at given times of the lifecycle. In a further embodiment, only one such ID may be recognized or available at a given time. In another embodiment, device 101 may include different IDs at different times of the lifecycle. In FIG. 1, device 101 is shown as it is moved to and handled by various portions of system 100.

The security lifecycle of device 101 may include any suitable number and kind of phases. The security of access to different aspects or modes of device 101 may change according to the phase of the security lifecycle in which device 101 is in at a given time.

System 100 may include any suitable number and kind of other subsystems therein. For example, system 100 may include a production system 104, a test system 106, or an affiliate system 108. Moreover, system 100 may produce device 101 for use by an end user with another system 132, which may or may not be part of system 100.

The phases of the security lifecycle of device 101 may roughly correspond to the subsystems of system 100 in terms of the desired configuration of device 101. In other solutions, a given device is assumed to be in a given phase of the security lifecycle based upon the presence of the device within a given subsystem. However, in one embodiment system 100 may utilize device IDs to identify what phase of the security lifecycle device 101 should be in, or is configured for, regardless of the presence of device 101 in a particular subsystem or outside of system 100.

IDs for device 101 may be in any suitable form. In one embodiment, an ID for device 101 may uniquely identify device 101 among all instances of device 101. In another embodiment, an ID for device 101 may uniquely identify a model, class, type, version, or other categorization assigned to device 101, or to which device 101 belongs. In such an embodiment, an ID for device 101 might not uniquely identify device 101 among all other instances of devices with the same model, class, type, version, or other categorization of device 101. In yet another embodiment, an ID for device 101 may include information on a hierarchy of models, classes, types, versions, or other categorizations assigned to device 101. In such an embodiment, the ID may specify such a categorization to which device 101 and other devices of various models, classes, types, versions, or other categorizations belong. These devices may be related by a set of common features, but differ as to other features. In yet another embodiment, IDs for device 101 may include more than one possible ID, or a set of IDs. Such IDs may be a range of IDs, ID values, or possible IDs. In still yet another embodiment, IDs for device 101 may implicitly specify features for device 101. Moreover, an ID for device 101 may include any permutation of any of these embodiments.

By using device IDs to identify the phase of the security lifecycle, errors may be reduced wherein a device is incorrectly assumed to be in a different security lifecycle phase. Errors may result from such an incorrect assumption. For example, creators of device 101 might desire that a debug mode be unavailable after device 101 has been provided from a production and test facility. In another example, programming of device 101 may be permanent with some techniques. These include one-time programming (OTP), electronic fuses, and other suitable write-once mechanisms. While certain portions of device 101 may be permanently written with data in non-volatile memory using such techniques, a later entity can still, mistakenly or maliciously, overwrite unwritten bits in such a configuration. For example, if a memory location in device 101 is written with a value "0001" in fuses during production, the "0" values may be a default value in the destination memory, and thus not specifically written in order for the resultant "0" value to be set. However, these "0" values may remain writeable. In contrast, the "1" values may be written and thus unchangeable. If device 101 is mistakenly reintroduced to the same production phase for a different intended use, the same memory location might be rewritten with "1000", resulting in "1001" in the memory location. This may have catastrophic results on the operation of device 101, such as making device 101 non-functional. System 100 may provide increased security during production of device 101 so that device 101 is less prone to attacks and writing mistakes.

Production system 104 may include manufacturing, production, or any other subsystem configured to create device 101. Test system 106, although called "test", may include manufacturing test, validation, quality assurance, or development engineering subsystems. Test system 106 may be configured to evaluate the performance of device 101 as produced by production system 104. Test system 106 may evaluate such a performance as part of production of device 101 for end use, or production of device 101 as part of an iterative engineering design process. Thus, device 101 may be intended for release, sale, or distribution to end users, or may be intended only to be used internally in an entity that is designing instances of device 101. Production system 104 and test system 106 may be included as part of a same logical entity 102, which is to produce instances of device 101 for consumption and use by other entities.

Any other suitable entities may consume or use instances of device 101. For example, device 101 may be used by an end user with another system 132 in a real-world application outside of system 100. In another example, still other entities, such as affiliate system 108, may make further modifications, customizations, additions, or other changes to instances of device 101. Such changes may be made to instances of device 101 before an end user will use the instance of device 101. For example, instances of device 101 may be produced by logical entity 102 with a variety of options available that may be further customized, such as memory space, clock speed, number of channels, peripherals, or functions. Such memory space may include, for example, options to provide 512 MB, 256 MB, 128 MB, or 64 MB of memory available to end users. Such kinds of functions may include, for example, analog-to-digital conversions that may be implemented for end users as a multimeter or as an oscilloscope, and the particular instance of device 101 may be customized for end users as to which particular use (multimeter or oscilloscope) is to be used. Such kinds of functions may also include, for example, a choice of different communication protocols, such as I2C or SPI. A particular instance of device 101 may be customized for end users as to which particular use (I2C or SPI) is to be used. Such peripherals may include, for example, particular timers, counters, pulsed width modulators, encryption and decryption engines, or any other suitable mechanism that may be built within device 101 and selectively enabled. The selections of features may be performed, as described above, in affiliate system 108, and may also be performed in production system 104.

For example, an ID for device 101 may be of the form WWWW-XXXX-YYYY-Z. This example ID is presented merely as an illustration, the fields of an ID for device 101 may be longer or shorter, in any order, may be optional depending upon a given implementation, or have any other suitable variation.

The string of "W" values may define a general categorization of products to which device 101 belongs. Based upon the string of "W" values, portions of system 100 may define a set of features for device 101, or presume that device 101 will have such a set of features. Such a set of features may be a subset of the total features of device 101.

The string of "X" values may define a specific model, version, or other categorization of products to which device 101 belongs. Based upon the string of "X" values, alone in combination with the string of "W" values, portions of system 100 may define a set of features for device 101, or presume that device 101 will have such a set of features. Such a set of features may be a subset or full set of the total features of device 101.

The string of "Y" values may define specific features for device 101, or yet a more specific model, version, or other categorization of products to which device 101 belongs. Based upon the string of "Y" values, alone in combination with the strings of "W" and "X" values, portions of system 100 may define a set of features for device 101, or presume that device 101 will have such a set of features. Such a set of features may be a subset or full set of the total features of device 101.

Each of the "W", "X", and "Y" values may be set by any suitable portion of system 100. For example, production system 104 may set the "W" values, test system 106 may set the "X" values, and affiliate system 108 may set the "Y" values. However, in another example, production system 104 or test system 106 may set all of the "W", "X", and "Y" values. Only a subset of the "W", "X", and "Y" values might be set for a given device ID, wherein other values, not yet set, may be wildcards or nonce values. For example, the "W" values may reflect a product family for device 101, the "X" values may reflect a model number within the product family for device 101, and the "Y" values may reflect specific features or options of the model number for device 101. For example, if in test system 106 only the "W" and "X" values have been set, then the "Y" values may be nonce or wildcard values. Test system 106 may presume that the features of device 101 include those specified by the "W" and "X" values, while features defined by "Y" values may be optionally included at a later time. Thus, test system 106 may be configured to test all permutations of features to be defined by the "Y" values.

In one embodiment, the "Z" values may be used by system 100 to indicate the present phase of device 101 for the security lifecycle. In a further embodiment, the "Z" values might be set by production system 104 or test system 106. In yet a further embodiment, the "Z" values might also be set by affiliate system 108. Production system 104 may be configured to set the "Z" value to a first value. Test system 106 may be configured to update the "Z" value to a second value. The first and second values may be the same or different. Affiliate system 108 may be configured to update the "Z" value to a third, further value.

In one embodiment, a particular "Z" value, and thus ID, may indicate that device 101 is to be used within a particular context, or that device 101 was previously issued by a part of system 100. For example, a particular "Z" value, and thus ID, such as zero, may indicate that device 101 has been produced and is to be used within production system 104. Another particular "Z" value, such as one, may indicate that device 101 has been produced, issued by production system 104, and is to be used within test system 106. Yet another particular "Z" value, and thus ID, such as two, may indicate that device 101 has been produced, validated, issued by test system 106, and is to be used within affiliate system 108. Still yet another particular "Z" value, and thus ID, such as three, may indicate that device 101 has been released by system 100 for use by an end user. Although these example values are given, more or fewer different values may be used. For example, different phases of use in test system 106 or production system 104 may use specific, different "Z" values and IDs.

Based upon the different ID, such as a different ID embodied by a different "Z" value, system 100 and other users of device 101 may be able to identify the phase of the security lifecycle to which device 101 belongs, and to what part of system 100 device 101 is to be used. Security features may be enabled or disabled based upon such an ID. When a given part of system 100 is to provide device 101 to another part of system 100, or to end users, and the security lifecycle of device 101 is to be advanced, the ID may be changed or replaced to reflect the next stage.

Each subsystem of system 100 may include a device programmer 110. Device programmer 110 may be configured to write data to device 101. Device programmer 110 may be implemented by analog circuitry, digital circuitry, instructions for execution by a processor (not shown), or any suitable combination thereof. The particular implementation of device programmer 110 may vary between subsystems of system 100. For example, device programmer 110A of production system 104 may be able to write to portions of memory 116, based on device IDs, of device 101 that are inaccessible to other subsystems. Device programmer 110B of test system 106 may be able to write to portions of memory 116, based on device IDs, of device 101 that are inaccessible to the affiliate subsystem 108.

Each subsystem of system 100 may include a database 112. Database 112 may be implemented in any suitable manner, such as a file system, relational database, or other suitable organization. Database 112 may include profiles, files, or instances of data for programming device 101 in a particular manner, or for mapping the memory available for use in memory 116. Such files or instances of data may be referred to as .pic files. The contents of each instance of database 112 may vary between subsystems of system 100. For example, database 112A of production system 104 may include files for device 101 that are unavailable in other instances of database 112. Database 112B may include files for device 101 that are unavailable in database 112C.

In one embodiment, different portions of device 101 may be available to be written to during different phases of the security lifecycle. In a further embodiment, such different portions of device 101 may be made available for writing by the use of different device IDs assigned to device 101 during the different phases of the security lifecycle. A given device ID may define, according to contents of database 112, device data of device 101 such as a memory map of memory 116. The memory map of memory 116 may define, for example, what areas or portions of memory 116 are available to be accessed or written to, what portions of memory 116 are available to be read from, or what portions of memory 116 remain undefined and unavailable to be read or written.

Storage of device ID may be performed in any suitable manner. The device ID may be stored in a manner so that the device ID may be only changed by increasing its enumeration up or down. For example, storage of the device ID may be performed by fuses and a thermometer counter such that the device ID may be only incremented. The higher the number of the device ID, the further along in the product lifecycle that the device is within the system. Moreover, the higher the number of the device ID, the higher the secureness of the device. In one embodiment, however or wherever the device ID is stored, it may be accessible to any device programmer in the system or to end users. The device ID may be read by, for example, 2-wire or 4-wire JTAG, or by software.

For example, production system 104 may create an instance of device 101. Device 101 may include memory 116 that is completely empty. Device programmer 110A may be configured to issue an initial device ID to device 101, such as ID1 118. ID1 118 may have a "Z" value or any suitable value that indicates to a reader that ID1 118 is in a phase of the security lifecycle associated with production system 104. The device ID, through reference of databases 112, may specify features of device 101, such as, as discussed above, a memory map, as well as selection of a core, enabled peripherals, or any other suitable features. ID1 118 may be stored in memory 116 or in any other suitable portion of device 101.

Device programmer 110A may be configured to write to memory 116. In particular, device programmer 110A may be configured to write to a specific portion or area of memory 116, such as segments 117, 120. The contents of the data written to segment 120 may be, for example, ID1 118, public/private keys for authentication, settings, or any other suitable data. In particular the IDs used in system 100 may each be written to segment 117.

When device 101 has completed all aspects of production system 104, device programmer 110A may assign a different ID to device 101, such as ID2 119. ID1 118 may be overwritten in segment 117 or stored in a portion of memory 116 that is no longer accessible in a subsequent phase of the security lifecycle. ID1 118 may be configured to be replaced by ID2 119 by, for example, being overwritten in a same location in segment 117, or included in a portion of memory 116 that is no longer accessible in the subsequent phase wherein ID2 119 is included in a portion of memory 116 that is accessible in the subsequent phase. Blocking such access may be performed by memory maps associated with ID2 119 that do not include locations wherein ID1 118 was stored. However, in one embodiment ID2 119 may be stored in segment 117 of memory 116 by writing to fuses that change ID1 118 to ID2 119.

Device 101 may then be provided to test system 106.

In test system 106, ID2 119 may be read by device programmer 110B. Based on ID2 119, device programmer 110B may access database 112B to determine characteristics of device 101, such as a memory map of memory 116. Device programmer 110B may be configured to write data to device 101. The data may include, for example, public/private keys written to memory 116, or other settings. Device programmer 110B may be configured to write to a specific portion of memory 116, such as segment 122. In one embodiment, data in segment 120 may be visible to test system 106 and device programmer 110B. This may result from device programmer 110B being configured to access a memory map for device 101 based on ID2 119 that maps the entirety of memory 116. In another embodiment, data in segment 120 might not be visible or unseen to test system 106 and device programmer 110B, wherein a memory map for device 101 based on ID2 119 may leave out segment 120 from a memory map of memory 116. Data in segment 122 may include debug features. ID2 119 may be visible in segment 117, and mapped in the memory map of memory 116.

When device 101 has completed all aspects of test system 106, device programmer 110B may assign a different ID to device 101, such as ID3 126. ID2 119 may be overwritten in segment 117 or may have been stored in a portion of memory 116 that is no longer accessible in a subsequent phase of the security lifecycle. Blocking such access may be performed by memory maps associated with ID3 126 that do not include locations wherein ID2 119 was stored.

After issuance of ID3 126 to device 101, memory maps based upon ID3 126 might not map the entirety of memory 116, leaving out segment 120. Thus, affiliate system 108 or end users might not be able to access segment 120 when accessing the same instance of device 101. In some cases, the memory maps based upon ID3 126 may similarly leave out segment 122. However, such memory maps may still include segment 117 so that the identifier may be read and programmed.

Device 101 may then be provided to affiliate system 108.

In affiliate system 108, ID3 126 may be read by device programmer 110C. Based on ID3 126, device programmer 112C may access database 112C to determine characteristics of device 101, such as a memory map of memory 116. Device programmer 110C may be configured to write data to device 101. The data may include, for example, public/private keys written to memory 116, or other settings 130. The data may include software such as application 128 to be loaded onto device 101, as well as digital signatures of such software. Device programmer 110C may be configured to write to a specific portion of memory 116, such as segment 124 or segment 125. In one embodiment, data in segment 124 may be visible to end users of device 101. In another embodiment, data in segment 124 might not be visible to end users of device 101 and thus data for use by end users of device 101 may be written to segment 125. Data in segment 122, originally used by test system 106 may or may not be visible by device programmer 110C, depending upon the configuration of system 100. Similarly, data in segment 120, originally used by production system 104, might not be visible to affiliate system 108 and thus to end users of device 101. Such visibility may be established by memory maps loaded from database 112C based upon ID3 126. Device 101, through ID3 126, may be associated with a particular .pic file setting the features, memory map, and identity of device 101. Identifiers in segment 117 may still be visible according to the memory maps so that the identifiers may be read and programmed.

When device 101 has completed all aspects of affiliate system 108, device programmer 110C may assign a different ID to device 101, such as ID4 129. ID3 126 may be overwritten in segment 117 or may have been stored in a portion of memory 116 that is no longer accessible in a subsequent phase of the security lifecycle, such as use by end users outside of system 100. Blocking such access may be performed by memory maps associated with ID4 129 that do not include locations wherein ID3 126 was stored.

Device 101 may be provided to an end user, who may be outside of system 100. Device 101 may have features defined by one or more of subsystems 104, 106, 108 through issuance of ID4 129, or settings 130. Device 101 in such an environment may be configured to interface with other systems, such as system 132. System 132 may include a processor 134 and an application 136. Depending upon the memory map associated with ID4 129, different portions of memory 116 may be available for use. A memory map for ID4 129 may be written to settings 130, so that an end user does not require a database to store the memory map.

Device 101 may utilize information such as that stored in segment 124 or segment 125 (depending upon where it is stored and the segments visible to device 101 given memory maps associated with ID4 129). Device 101 may utilize such information to, for example, verify its own contents, or to communicate with or authenticate system 132. Device 101, in the hands of the end user, might only be able to view contents stored in segments 117, 124, 125, and may be unable to view contents such as those in segments 120, 122. This may be because a memory map available to device 101 after issuance by affiliate system 108 might not map segments 120, 122. Device 101 may have access to remaining unused portions of memory 116.

Different modes of operating device 101 may be available only in particular phases of the security lifecycle of system 100. For example, a debug mode for operating device 101 may expose various inner workings or information of device 101 that an engineer, developer, or test technician in test system 106 may wish to use. However, creators of device 101 might desire that such a debug mode might not be available for use by end users of device 101, or by affiliate system 108. Thus, debug mode for device 101 might be only made available to, for example, production system 104 or test system 106. System 100 may achieve such a debug mode through the use of device IDs that are specific to a particular portion or portions of system 100. For example, code for the debug mode may be stored in memory that is only available in segments that are mapped for ID1 118 and ID2 119. If the segment, such as segment 122, in which the debug mode code is stored is inaccessible to memory maps for ID3 126 or ID4 129, then users in affiliate system 108 or end users of device 101 receiving device 101 with such IDs might not be able to access the debug mode.

Figure 2:
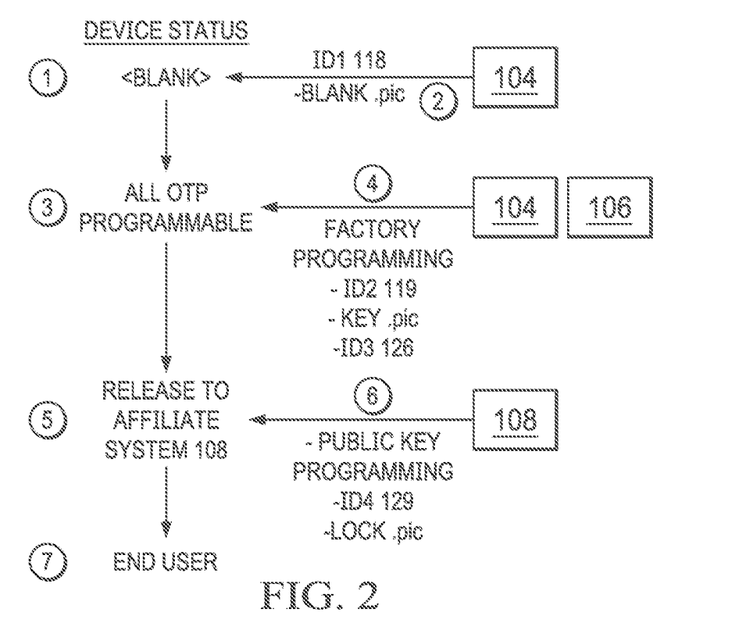
FIG. 2 is an illustration of a process of a single programming device with different IDs according to different phases of the security lifecycle, according to embodiments of the present disclosure.

FIG. 2 is an illustration of a process of programming device 101 with different IDs according to different phases of the security lifecycle, according to embodiments of the present disclosure. Illustrated is a status of device 101.

At (1), device 101 may be newly produced by production system 104 and may be completely blank. At (2), production system 104 may issue ID1 118. ID1 118 may be issued that is associated with a .pic file such as Blank .pic that specifies that the entire one-time programmable portions of memory 116 are currently programmable. A part of system 100 reading ID1 118 may load Blank .pic as a configuration file from an associated database based upon ID1 118 to determine what phase of the security lifecycle device 101 is in, whether any secured features are available, and what portions of memory 116 are readable and programmable based upon memory maps of the configuration file.

Thus, at (3) all portions of memory 116 are available for one-time programming, or at least those portions of memory that are configured to be programmed in such a manner.

At (4), various portions of system 100 such as production system 104 or test system 106 may perform programming of device 101. Such programming may include, for example, calibration information, or other information such as security keys. Some security keys may be available internally during use by production system 104 or test system 106, but unavailable to affiliate system 108 or to end users. Such security keys may be written to portions of memory 116 that are not mapped by configuration files or memory maps associated with IDs for such later phases of the security lifecycle, such as affiliate system 108 or end users. Other security keys may be available to affiliate system 108 or end users. Such security keys may be written to portions of memory 116 mapped by configuration files or memory maps associated with IDs for such later phases of the security lifecycle.

During the programming and use of keys to be used internally to systems 104 or 106, ID2 119 may be issued to device 101. ID2 119 may be associated with memory maps defining, for example, portions of memory 116 that are accessible for such internal use for systems 104, 106. These keys may be used for secured debugging, test, authentication, or other processes. Keys written to memory 116 during this phase may be made unavailable to later phases of the security lifecycle by issuance of further IDs, such as ID3 126, for which there is no memory map of the areas of memory 116 containing such keys.

Upon completion of provisioning by production system 104 and test system 106, device 101 may be prepared for use by affiliate system 108. Affiliate system 108 may be configured to provide its own keys into memory 116 for its own internal use. Thus, test system 106 may issue ID3 126 to device 101. ID3 126 may be associated with a .pic file, such as key .pic, that maps portions of memory 116 for affiliate system 108 to write its own keys.

At (5), device 101 may be released to affiliate system 108. At (6), affiliate system 108 may perform its own key programming, such as writing a public key to portions of memory 116 mapped in association with ID3 126. Affiliate system 108 may perform other tasks as needed for provisioning device 101. Furthermore, key .pic, associated with ID3 126, might not map debug lock bits in memory 116, preventing a user in affiliate system 108 from accidentally locking down their own instance of device 101.

Upon completion of provisioning of device 101, affiliate system 108 may issue ID4 129 to device 101. ID4 129 may be associated with a .pic file, such as lock .pic. Lock .pic may be stored in settings 130 or elsewhere on device 101 and defining memory maps for memory 116 that do not include the segments that include public keys written above in (5), nor to other segments written to by production system 104 or test system 106. Thus, the memory previously used by these systems may be subsequently locked or not visible to end users of device 101.

At (7), device 101 may be released to end users. End users might not be able to see portions of memory 116 that are not mapped when ID4 129 is used, thus obscuring these from reads and writes. Other memory that is mapped by ID4 129 may be read and written.

Figure 3:
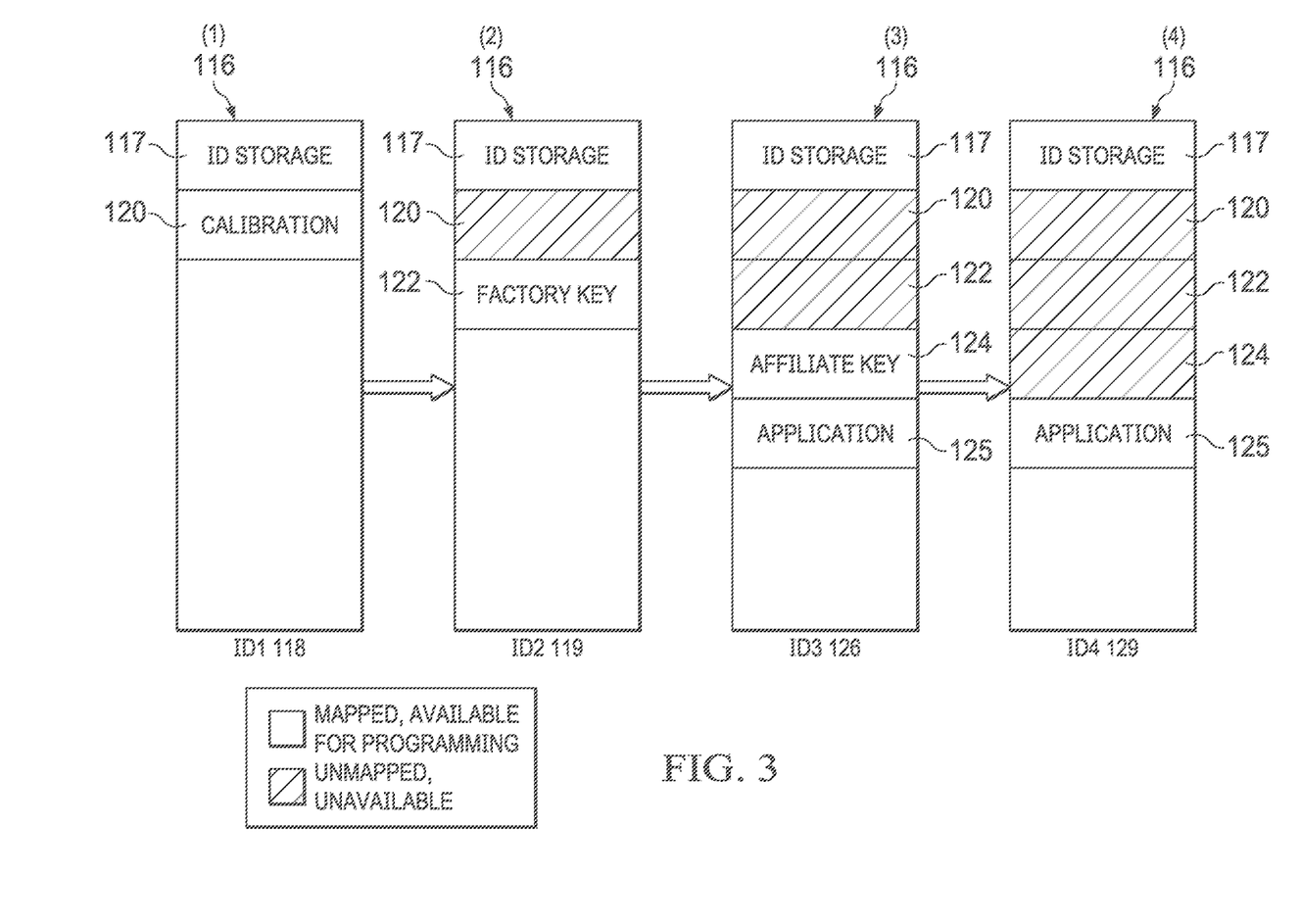
FIG. 3 is an illustration of memory maps of memory, given different device IDs, according to embodiments of the present disclosure.

FIG. 3 is an illustration of memory maps of memory 116 given different device IDs, according to embodiments of the present disclosure. Illustrated are memory maps of memory 116 during four different phases of the security lifecycle of system 100, enumerated from (1) to (4). Each such different phase may be associated with a different device ID, denoted at the bottom. Segments or portions of memory 116 that are available for programming for a given memory map are illustrated without shading. Segments or portions of memory 116 that are unavailable or unmapped for programming for a given memory map are illustrated with shading.

At (1), memory 116 may be within device 101 with ID1 118 as provided by production system 104. ID1 118 may be written to segment 117. Device 101 may be within a phase of the security lifecycle in which device 101 is intended to be used within production system 104. Production system 104, reading ID1 118 and looking it up in its database, may determine from the resulting .pic file the memory map for memory 116 as shown at (1). Specifically, the memory map may illustrate that the entirety of memory 116 is available for programming. Production system 104, as described above, may write various information or data to memory 116, such as calibration data. This may be stored in segment 120. The remainder of memory 116 may go unused by production system 104.

At (2), memory 116 may be within device 101 with ID2 119 in segment 117. Device 101 may be within a phase of the security lifecycle in which device 101 is intended to be used within test system 106. Production system 106, reading ID2 119 and looking it up in its database, may determine from the resulting .pic file the memory map for memory 116 as shown at (2). In one embodiment, as shown in FIG. 3, the memory map may illustrate that segment 120 is not available for programming, but the remainder of memory 116 is available for programming. Test system 106, as described above, may write various information or data to memory 116, such as a key used for internal purposes, such as the factory key denoted in the figure. This may be stored in segment 122. The remainder of memory 116 may go unused by production system 104.

At (3), memory 116 may be within device 101 with ID3 126 in segment 117. Device 101 may be within a phase of the security lifecycle in which device 101 is intended to be used within affiliate system 108. Affiliate system 108, reading ID3 126 and looking it up in its database, may determine from the resulting .pic file the memory map for memory 116 as shown at (3). In one embodiment, as shown in FIG. 3, the memory map may illustrate that segments 120, 122 are not available for programming, but the remainder of memory 116 is available for programming. Affiliate system 108, as described above, may write various information or data to memory 116, such as a key used for internal purposes, such as an affiliate key. This may be stored in segment 124. Furthermore, as discussed above within the context of FIG. 1, affiliate system 108 may write data for use by end users of device 101, such as an application. This may be stored in segment 125. The remainder of memory 116 may go unused by production system 104.

At (4), memory 116 may be within device 101 with ID4 129 in segment 117. Device 101 may be within a phase of the security lifecycle in which device 101 is intended to be used by end users. Any entity using device, reading ID4 129 and determining a resulting memory map, or viewing a memory map set on device 101, may determine a memory map for memory 116 as shown at (4). In one embodiment, as shown in FIG. 3, the memory map may illustrate that segments 120, 122, and 124 are not available for programming, but the remainder of memory 116 is available for programming. An entity accessing device 101 may be able to read data from segment 125 and write to memory 116 as needed.

Figure 4:
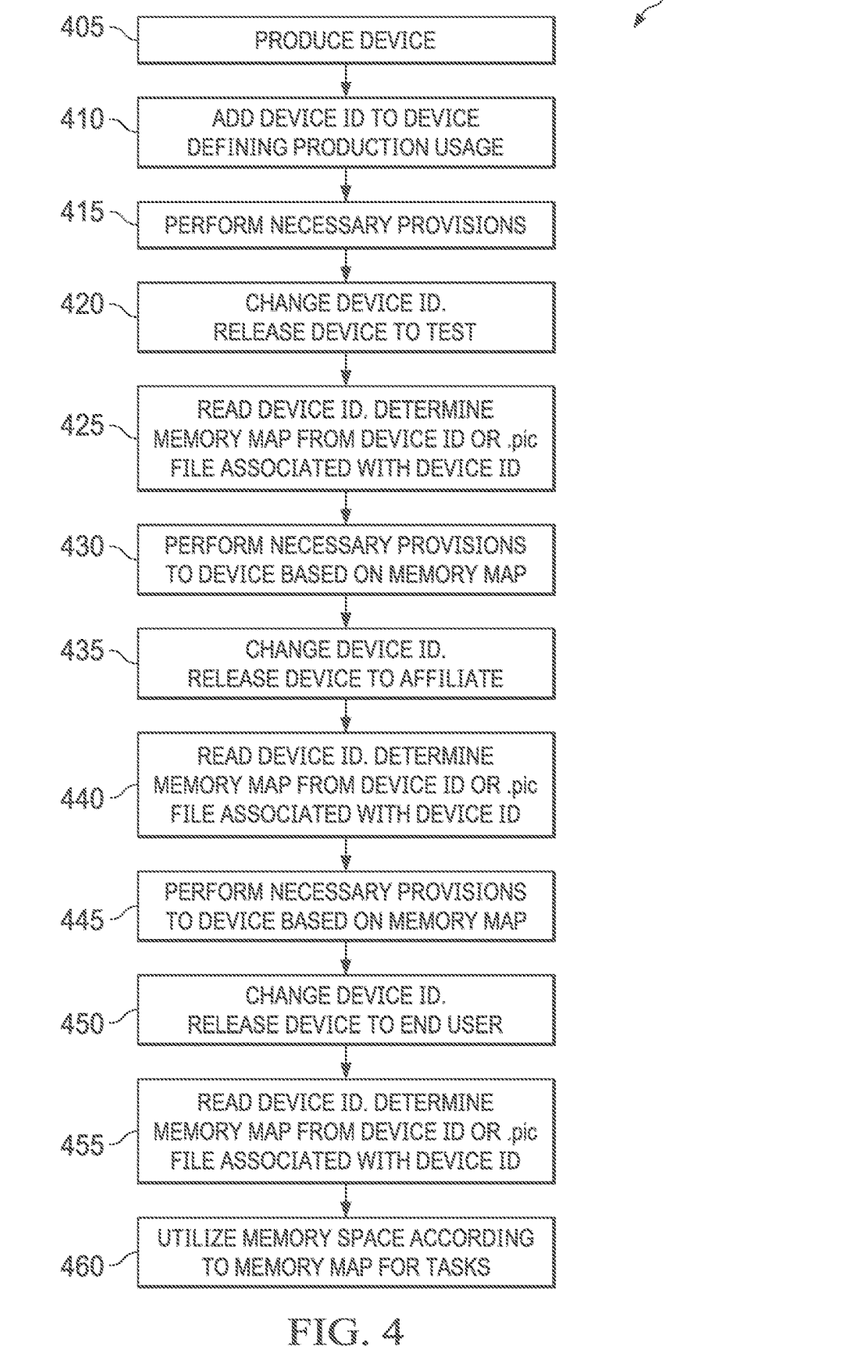
FIG. 4 is an illustration of an example method for providing a device with a security lifecycle, according to embodiments of the present disclosure.

FIG. 4 is an illustration of an example method 400 for providing a device with a security lifecycle, according to embodiments of the present disclosure.

Method 400 may be implemented by any suitable portion of system 100 as illustrated in FIGS. 1-3, such as by device programmers 110. Method 400 may be performed with more or fewer steps than those shown in FIG. 4. Moreover, the steps of method 400 may be repeated, omitted, performed in parallel, performed recursively, or performed in a different order than shown in FIG. 4. Method 400 may repeat as necessary. Method 400 may begin at any step, such as at step 405.

At step 405, a device may be produced. At step 410, an ID may be assigned and added to the device. A memory map for the device based on the ID may specify a phase of production in terms of a security lifecycle for the device. The memory map may define that all areas of a memory are available for programming.

At step 415, provisions for the device may be made, including programming memory on the device.

At step 420, the ID may be changed or replaced with a new ID and the device may be released to test or validation systems. A memory map for the device based on the new ID may specify a phase of test or validation in terms of a security lifecycle for the device.

At step 425, the ID of the device may be read, and the memory map for the device may be accessed based upon the ID. The memory map may be read from a plc file that is determined based on the ID. The memory map may specify that all areas of memory, except those previously mapped on the ID in step 410, may be available for programming.

At step 430, provisions for the device may be made, including programming memory on the device, based on the available portions identified in the memory map.

At step 435, the ID may be again changed or replaced with a new ID and the device may be released to affiliate systems. A memory map for the device based on the ID of step 435 may specify a phase of affiliate customization or finalization of products in terms of a security lifecycle for the device.

At step 440, the ID of the device may be read, and the memory map for the device may be accessed based upon the ID. The memory map may be read from a plc file that is determined based on the ID. The memory map may specify that all areas of memory, except those previously mapped on the ID in step 410 or step 425, may be available for programming.

At step 445, provisions for the device may be made, including programming memory on the device, based on the available portions identified in the memory map.

At step 450, the ID may be again changed or replaced with a new ID and the device may be released to end users. A memory map for the device based on the ID of step 450 may specify a phase of end user use in terms of a security lifecycle for the device.

At step 455, the ID of the device may be read, and the memory map for the device may be accessed based upon the ID. The memory map may be read from a plc file that is determined based on the ID. The memory map may specify that the memory is available for use except those areas previous mapped in steps 410, 425, or 440.

At step 460, the available memory space may be used for various tasks of the device.

Although particular embodiments have been described within this disclosure, one of skill in the art will recognize that certain additions, changes, and variations may be made without departing from the spirit and teachings of the present disclosure.

What is claimed is:

1. A method, comprising:
   accessing a first electronic device;
   identifying a first device identifier of the first electronic device;
   based upon the first device identifier, accessing first device data from a database including a plurality of device profiles;
   based upon the first device data, determining a first area of memory of the first electronic device that can be written; and based on the determination of the first area of memory of the first electronic device that can be written, writing data to the first area of memory of the first electronic device;
wherein the first device data includes a first memory map of the first electronic device, the first memory map to define the first area of memory of the first electronic device as programmable.

2. The method of claim 1, wherein the first memory map is to define a second area of memory of the first electronic device that is not programmable.

3. The method of claim 2, wherein the first memory map is to define the second area of memory of the first electronic device as unseen from usage of the first electronic device.

4. A method, comprising:
accessing a first electronic device;
identifying a first device identifier of the first electronic device;
based upon the first device identifier, accessing first device data from a database including a plurality of device profiles;
based upon the first device data, determining a first area of memory of the first electronic device that can be written;
based on the determination of the first area of memory of the first electronic device that can be written, writing data to the first area of memory of the first electronic device; and
upon writing data to the first area of memory of the first electronic device, replacing the first device identifier with a second device identifier on the first electronic device.

5. The method of claim 4, wherein the second device identifier is to define a third area of memory that can be written.

6. The method of claim 5, wherein the method is performed at an apparatus and the second device identifier is to prevent one or more other apparatuses from writing data to the first area of memory of the first electronic device.

7. The method of claim 4, wherein the second device identifier is associated with a second memory map of the first electronic device, the second memory map to define the third area of memory of the first electronic device as programmable.

8. The method of claim 4, wherein the second device identifier is to define that the first area of memory is unprogrammable.

9. The method of claim 4, comprising:
identifying a third device identifier of a second electronic device; and
based upon the third device identifier, determining that a different device programmer is to write data to the second electronic device instead of the device programmer.

10. The method of claim 4, wherein:
the first device identifier is to allow access through a first memory map to debug features of the first electronic device; and
the second device identifier is to deny access through a second memory map to debug features of the first electronic device.

11. A method, comprising:
providing access to a first electronic device for a device programmer;
providing a first device identifier to the device programmer from a memory; and
based on the first device identifier:

denoting a phase of production for the first electronic device; and
allowing access to a first area of the memory that can be written;
wherein the first device identifier is to be replaced by a second device identifier.

12. The method of claim 11, wherein the second device identifier is to define a third area of memory that can be written.

13. The method of claim 11, wherein the second device identifier is to prevent writes of data to the first area of the memory.

14. The method of claim 11, wherein the second device identifier is to define that the first area of memory is unprogrammable.

15. The method of claim 11, wherein the method is performed at an apparatus and:
the first device identifier is to allow access through a first memory map to debug features of the apparatus; and
the second device identifier is to deny access through a second memory map to debug features of the apparatus.

16. An article of manufacture comprising a machine-readable non-transitory medium, the medium including instructions, the instructions, when loaded and executed by a processor, cause the processor to:
access a first electronic device;
identify a first device identifier of the first electronic device;
based upon the first device identifier, access first device data from a database including a plurality of device profiles;
based upon the first device data, determine a first area of memory of the first electronic device that can be written; and
based on the determination of the first area of memory of the first electronic device that can be written, write data to the first area of memory of the first electronic device;
wherein the first device data includes a first memory map of the first electronic device, the first memory map to define the first area of memory of the first electronic device as programmable.

17. The article of claim 16, wherein the first memory map is to define a second area of memory of the first electronic device that is not programmable.

18. The article of claim 17, wherein the first memory map is to define the second area of memory of the first electronic device as unseen from usage of the first electronic device.

19. An article of manufacture comprising a machine-readable non-transitory medium, the medium including instructions, the instructions, when loaded and executed by a processor, cause the processor to:
access a first electronic device;
identify a first device identifier of the first electronic device;
based upon the first device identifier, access first device data from a database including a plurality of device profiles;
based upon the first device data, determine a first area of memory of the first electronic device that can be written; and
based on the determination of the first area of memory of the first electronic device that can be written, write data to the first area of memory of the first electronic device;
wherein the processor is to, upon writing data to the first area of memory of the first electronic device, replace the first device identifier with a second device identifier on the first electronic device.

20. The article of claim 19, wherein the second device identifier is to define a third area of memory that can be written.

21. The article of claim 20, wherein the second device identifier is to prevent one or more other apparatuses from writing data to the first area of memory of the first electronic device.

22. The article of claim 19, wherein the second device identifier is associated with a second memory map of the first electronic device, the second memory map to define the third area of memory of the first electronic device as programmable.

23. The article of claim 19, wherein the second device identifier is to define that the first area of memory is unprogrammable.

24. The article of claim 19, wherein the processor is to:
identify a third device identifier of a second electronic device; and
based upon the third device identifier, determine that a different device programmer is to write data to the second electronic device instead of the device programmer.

25. The article of claim 19, wherein:
the first device identifier is to allow access through a first memory map to debug features of the first electronic device; and
the second device identifier is to deny access through a second memory map to debug features of the first electronic device.

26. An article of manufacture comprising a machine-readable non-transitory medium, the medium including instructions, the instructions, when loaded and executed by a processor, cause the processor to:
provide access to a first electronic device for a device programmer;
provide a first device identifier to the device programmer from a memory; and
based on the first device identifier:
denote a phase of production for the first electronic device; and
allow access to a first area of the memory that can be written;
wherein the first device identifier is to be replaced by a second device identifier.

27. The article of claim 26, wherein the second device identifier is to define a third area of memory that can be written.

28. The article of claim 26, wherein the second device identifier is to prevent writes of data to the first area of the memory.

29. The article of claim 26, wherein the second device identifier is to define that the first area of memory is unprogrammable.

30. The article of claim 26, wherein the processor is of an apparatus and:
the first device identifier is to allow access through a first memory map to debug features of the apparatus; and
the second device identifier is to deny access through a second memory map to debug features of the apparatus.

* * * * *